Feb. 11, 1958 H. MEYER 2,822,622
INTERNAL MEASURING INSTRUMENTS
Filed Feb. 6, 1956

INVENTOR
Hans Meyer
BY Pierce, Scheffler & Parker
ATTORNEYS

United States Patent Office

2,822,622
Patented Feb. 11, 1958

2,822,622

INTERNAL MEASURING INSTRUMENTS

Hans Meyer, Renens, Switzerland

Application February 6, 1956, Serial No. 563,795

Claims priority, application Switzerland February 21, 1955

4 Claims. (Cl. 33—178)

This invention relates to internal measuring instruments.

Internal measuring instruments are known in which feeler pins slidably mounted in a feeler head are moved with the aid of an axially movable control member which is, for example, wedge shaped.

Internal measuring instruments are also known in which one or a plurality of transmission members are interposed between one or a plurality of feeler pins and an axially movable adjusting member.

It has now been found that the efficient operation of internal measuring instruments of the kind described, depends to a great extent on the good cooperation of the feeler pins with the adjusting member or with the transmission member. Feeler pins, adjusting member and transmission element are normally mounted in separate guides. If the instrument is to work efficiently, then these guides must be very accurately matched, thus leading to expensive production methods. In order to obviate this disadvantage it has already been proposed to mount the transmission member in the measuring head with play, in order that it may be more easily able to be adapted to the feeler pins. Such a proposal naturally entails the disadvantage that, particularly in measuring devices having three or more feeler pins, the transmission element can be situated outside the instrument axis in consequence of its play in the measuring body and thus interferes with an ideal setting of the instrument in the bore to be measured. It is significant that for these reasons instruments constructed in such manner require shaking into the correct measuring position.

The object of the present invention is to eliminate the foregoing drawbacks.

To this end, the invention provides an internal measuring instrument having one or more measuring pins mounted in a measuring head, an axially movable adjusting member and a transmission element disposed between the feeler pins and the adjusting member, in which the transmission element is articulately mounted in the measuring head and in which the adjusting member acts in the articulation center point of the transmission element.

In order to enable the invention to be more readily understood, reference is made to the accompanying drawings which illustrate diagrammatically and by way of example one embodiment thereof, and in which.

Figure 1:
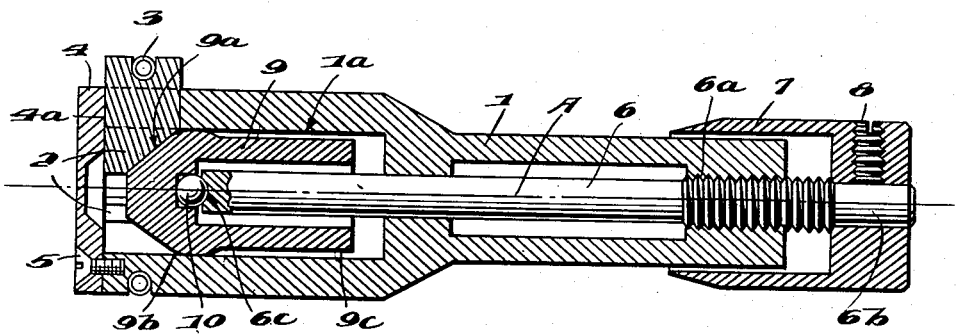
Figure 1 is a longitudinal section.

In Figure 1, reference numeral 1 denotes an instrument body, in which three feeler pins 2 of equal angular spacing, 120°, are radially movably mounted. The feeler pins 2 are pressed inwardly by an annular spring 3, which is clamped around them. A guide disc 4 is secured to the front of the body 1 by screws 5.

The adjustment of the feeler pins 2 is effected from a spindle 6 through a transmission element 9. The spindle 6 is provided with a measuring thread 6a and is guided in the body 1. A measuring drum 7, which is clamped on the rear spindle end 6b by means of a set screw 8, permits the spindle adjustment to be read off in known manner, the body 1 and the measuring drum 7 being provided with the usual calibrations.

The transmission element 9 is provided with wedge-shaped guide surfaces 9a, on which the feeler pins 2 rest. The transmission element 9 is articulately mounted with substantially no radial play, in guide bore 1a of the body 1.

Figure 2:
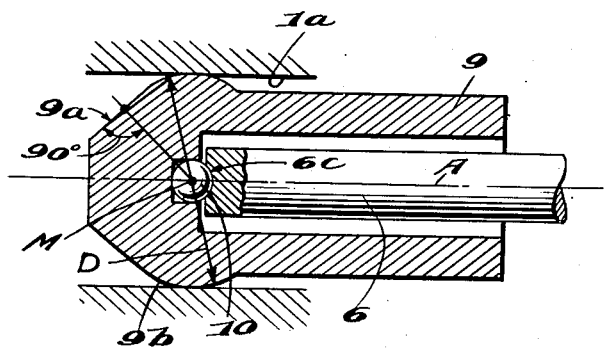
Figure 2 is a section through the transmission element of Figure 1 on a larger scale.

The articulation surface 9b forms a part of a spherical surface of the diameter D (Fig. 2) of the guide bore. It follows therefrom that the transmission element 9 can carry out a certain angular movement in the bore 1a relative to the axis A of the instrument, which angular movement is limited by contact between the upper or lower rear end portions or stops 9c of the transmission element 9 and the wall of the bore 1a. In order to maintain as accurate as possible a center setting of the feeler pin system, the center point M of the spherical surface 9b is arranged to coincide approximately with the point of intersection of the perpendicular bisector of the surface 9a with the instrument axis A.

A ball 10, the middle point of which coincides with the point M, is disposed in the transmission element 9. The spindle end 6c has a concave recess adapted to this ball having the same center of curvature as the ball.

When the surface 4a of the disc 4, on which the feeler pins 2 are guided, is not exactly perpendicular to the instrument axis A, the transmission element 9 can be flexibly adjusted into the correct position without the feeler pin system being substantially altered in its middle position.

Instead of being arranged perpendicularly to the axis of the spindle 6, the feeler pins 2 can be obliquely arranged with respect thereto. Said pins 2 can also be so formed and arranged that the lower edge thereof lies in the plane of the end face of the guide disc 4. Moreover each feeler pin can be pressed inwardly by a separate spring such as a leaf spring.

I claim:

1. An internal measuring instrument comprising an elongated head having a bore extending longitudinally axially therein, a plurality of measuring pins mounted in said head at one end thereof for movement in directions radial to the axis of said head, an axially movable adjusting member in the bore of said head, a transmission element disposed in said bore between the inner ends of said measuring pins and said adjusting member, said transmission element having a spherically shaped portion the diameter of which substantially equals the diameter of that portion of the bore in said head which it engages thereby to provide an articulation without play for said transmission element in said head, said transmission element including a ball the center of which is located at the center of said spherical portion of said transmission element and said inner end of said adjusting member including a concave surface engaging said ball and having a like center of curvature.

2. An internal measuring instrument having a measuring head, a plurality of feeler pins mounted in said measuring head, an axially movable adjusting spindle member and a transmission element disposed in said head between said feeler pins and said spindle member, said transmission element being articulately mounted in said measuring head and including wedge-shaped guide surfaces engaging said feeler pins, and said spindle member engaging said transmission element at the articulation center point of said transmission element, said center point being disposed approximately at the point of intersection of the longitudinal axis of said spindle member with a perpendicular bisector of one of said guide surfaces, 3. An internal measuring instrument as defined in claim 2 wherein said transmission element includes a spherical portion establishing the articulation and a ball having its center located at the center of the spherical portion of said transmission element, and wherein the inner end of said spindle member includes a concave surface engaging said ball, the center of curvature of said ball and concave surface being identical.

4. An internal measuring instrument as defined in claim 2 wherein said transmission element includes a portion extending rearwardly from the guide surfaces and which is adapted to engage and be stopped by the inner surface of said head after a predetermined angular movement of said transmission element.

References Cited in the file of this patent
UNITED STATES PATENTS

| | | |
|---|---|---|
| 1,671,168 | Steinle | May 29, 1928 |
| 2,329,067 | Maag | Sept. 7, 1943 |